(12) United States Patent
Li

(10) Patent No.: US 7,418,067 B1
(45) Date of Patent: Aug. 26, 2008

(54) PROCESSING DIVERSITY SIGNALS AT A MOBILE DEVICE USING PHASE ADJUSTMENTS

(75) Inventor: Yingxue Li, Bethlehem, PA (US)

(73) Assignee: Magnolia Broadband Inc., Bedminster, NJ (US)

(*) Notice: Subject to any disclaimer, the term of this patent is extended or adjusted under 35 U.S.C. 154(b) by 927 days.

(21) Appl. No.: 10/824,179

(22) Filed: Apr. 14, 2004

Related U.S. Application Data

(60) Provisional application No. 60/462,625, filed on Apr. 14, 2003.

(51) Int. Cl.
*H04B 7/10* (2006.01)

(52) U.S. Cl. .................. 375/347; 375/135; 375/146; 375/267; 375/299; 455/13.3; 455/132

(58) Field of Classification Search .......... 375/136, 375/144, 267; 709/236
See application file for complete search history.

(56) References Cited

U.S. PATENT DOCUMENTS

| | | | |
|---|---|---|---|
| 5,375,140 A | 12/1994 | Bustamante et al. | 375/142 |
| 5,570,349 A | 10/1996 | Bustamante et al. | 370/335 |
| 5,642,353 A | 6/1997 | Roy, III et al. | |
| 5,832,044 A | 11/1998 | Sousa et al. | |
| 5,918,154 A | 6/1999 | Beasley | 455/11.1 |
| 5,991,330 A | 11/1999 | Dahlman et al. | |
| 6,185,440 B1 | 2/2001 | Barratt et al. | |
| 6,226,509 B1 | 5/2001 | Mole et al. | |
| 6,236,363 B1 | 5/2001 | Robbins et al. | |
| 6,275,482 B1 | 8/2001 | Jevremovic et al. | 370/334 |
| 6,330,294 B1 | 12/2001 | Ansbro et al. | |
| 6,343,218 B1 | 1/2002 | Kaneda et al. | |
| 6,392,988 B1 | 5/2002 | Allpress et al. | |
| 6,492,942 B1 | 12/2002 | Kezys | |
| 6,526,090 B1 * | 2/2003 | Papasakellariou | 375/136 |

(Continued)

FOREIGN PATENT DOCUMENTS

EP 0 986 193 3/2000

(Continued)

OTHER PUBLICATIONS

Derryberry et al., "Transmit Diversity in 3G CDMA Systems", Wideband Wireless Access Technologies to Broadband Internet, IEEE Communications Magazine, Apr. 2002, pp. 68-75.

*Primary Examiner*—David C. Payne
*Assistant Examiner*—Adolf Dsouza
(74) *Attorney, Agent, or Firm*—Pearl Cohen Zedek Latzer, LLP

(57) ABSTRACT

Processing diversity signals includes receiving diversity signals at a number of antennas. The diversity signals have communicated information, and the antennas are associated with channel paths. A phase of at least one diversity signal is adjusted. The diversity signals are combined to form a combined signal. The combined signal is processed to yield the communicated information. A combined complex channel gain estimate is determined from the combined signal. An individual complex channel gain estimate is calculated for each antenna from the combined complex channel gain estimate. Phase adjustments associated with the channel paths are established according to individual complex channel gain estimates. The phase adjustments are applied to next diversity signals having next communicated information. The next diversity signals are processed to yield the next communicated information.

25 Claims, 2 Drawing Sheets

U.S. PATENT DOCUMENTS

| | | |
|---|---|---|
| 6,636,495 B1 | 10/2003 | Tangemann |
| 6,704,370 B1 | 3/2004 | Chheda et al. |
| 6,745,009 B2 | 6/2004 | Raghothaman |
| 6,810,264 B1 | 10/2004 | Park et al. |
| 6,859,643 B1 | 2/2005 | Ma et al. |
| 6,882,228 B2 | 4/2005 | Rofougaran |
| 2001/0047424 A1* | 11/2001 | Alastalo et al. ............. 709/236 |
| 2002/0172293 A1* | 11/2002 | Kuchi et al. ................. 375/267 |
| 2003/0043887 A1* | 3/2003 | Hudson ...................... 375/144 |
| 2003/0112880 A1 | 6/2003 | Walton et al. |
| 2004/0048584 A1 | 3/2004 | Vaidyanathan et al. |
| 2004/0085239 A1 | 5/2004 | Ukena et al. |
| 2005/0059355 A1 | 3/2005 | Liu |
| 2005/0143113 A1 | 6/2005 | Lee et al. |

FOREIGN PATENT DOCUMENTS

| | | |
|---|---|---|
| EP | 1 255 369 A1 | 11/2002 |
| EP | 1 282 242 | 2/2003 |
| EP | 1 282 244 | 2/2003 |
| EP | 1 284 545 | 2/2003 |
| EP | 1 262 031 | 5/2004 |
| GB | 2 353 437 | 2/2001 |
| WO | WO 97/24818 | 7/1997 |
| WO | WO 00/79701 | 12/2000 |
| WO | WO 01/69814 | 9/2001 |
| WO | WO 03/005606 A1 | 1/2003 |
| WO | WO 03/073648 A1 | 9/2003 |
| WO | WO 03/090386 | 10/2003 |
| WO | WO 2004/045108 | 5/2004 |
| WO | WO 2005/081444 | 9/2005 |

* cited by examiner

PROCESSING DIVERSITY SIGNALS AT A MOBILE DEVICE USING PHASE ADJUSTMENTS

RELATED APPLICATION

This application claims benefit under 35 U.S.C. § 119(e) of U.S. Provisional Application Ser. No. 60/462,625, entitled "PROCESSING SIGNALS RECEIVED AT MULTIPLE ANTENNAS,", filed Apr. 14, 2003, by Yingxue Li, et al.

TECHNICAL FIELD OF THE INVENTION

This invention relates generally to the field of wireless communication and more specifically to processing diversity signals at a mobile device using phase adjustments.

BACKGROUND OF THE INVENTION

Spatial diversity generally involves using multiple antennas for transmitting and receiving diversity signals in a wireless communication system. One known technique utilizes spatial diversity in conventional Code Division Multiple Access (CDMA) systems. This known technique, however, may require additional receiver devices at the mobile device to process diversity signals. Another known technique for using diversity antennas at a mobile device involves the use of low complexity receivers. This known technique, however, may require periodic training or adaptation to extract channel information from the diversity signals, which may result in performance degradation at high mobile speeds. Consequently, known techniques for processing diversity signals have been unsatisfactory in certain situations.

SUMMARY OF THE INVENTION

In accordance with the present invention, disadvantages and problems associated with previous techniques for processing diversity signals may be reduced or eliminated.

According to one embodiment, processing diversity signals includes receiving diversity signals at a number of antennas. The diversity signals have communicated information, and the antennas are associated with channel paths. A phase of at least one diversity signal is adjusted. The diversity signals are combined to form a combined signal. The combined signal is processed to yield the communicated information. A combined complex channel gain estimate is determined from the combined signal. An individual complex channel gain estimate is calculated for each antenna from the combined complex channel gain estimate. Phase adjustments associated with the channel paths are established according to individual complex channel gain estimates. The phase adjustments are applied to next diversity signals having next communicated information. The next diversity signals are processed to yield the next communicated information.

Certain embodiments of the invention may provide one or more technical advantages. A technical advantage of one embodiment may be that a mobile device may use a reduced number of RAKE receivers, which may decrease the size, cost, and complexity of the mobile device. Another technical advantage of an embodiment may be that adjusting the phase of the diversity signals using a complex channel gain estimate may eliminate the need for periodic training. This may allow for efficient use of conventional Code Division Multiple Access (CDMA) protocols. Yet another technical advantage of an embodiment may be that the average performance of a diversity antenna mobile device may be significantly improved compared with a single antenna mobile device.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
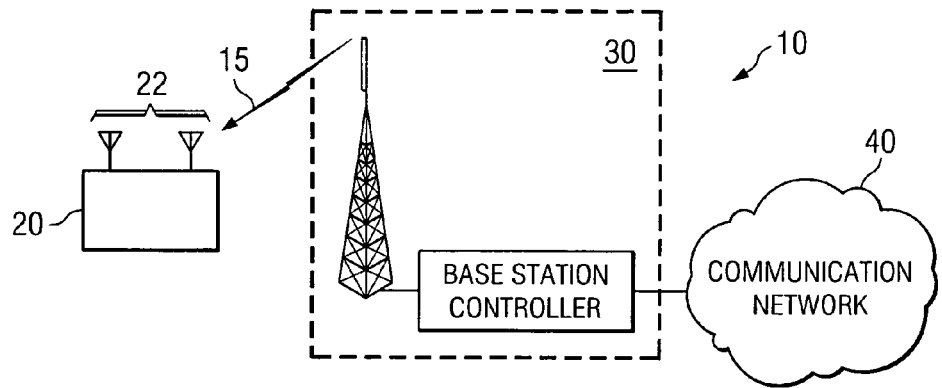
FIG. 1 is a block diagram of one embodiment of a communication system incorporating a diversity antenna system that may be used in accordance with the present invention.

FIG. 1 is a block diagram of an embodiment of a communication system 10 incorporating a diversity antenna system. According to the illustrated embodiment, a mobile device 20 communicates with communication system 10 that includes a base station 30 coupled to a communication network 40 as shown. In operation, base station 30 transmits a transmit signal 15 that carries information. Receive antennas 22 of mobile device 20 detect transmit signal 15 as diversity signals. The diversity antenna system of mobile device 20 determines complex channel gain estimates corresponding to the diversity signals, and calculates phase adjustments according to the complex channel gain estimates. The phase adjustments are applied to subsequent diversity signals in order to retrieve information communicated in the subsequent diversity signals.

Mobile device 20 communicates in the base station 30. Mobile device 20 may comprise, for example, a personal digital assistant, a cellular telephone, a mobile handset, or any other device suitable for communicating with base station 30. Mobile device 20 may utilize, for example, Global System for Mobile communication (GSM) technology, Code Division Multiple Access (CDMA) technology, or any other suitable mobile communication technology. According to the illustrated embodiment, mobile device 20 utilizes a conventional CDMA protocol to communicate with base station 30.

Base station 30 provides mobile device 20 with access to communication system 10. Base station 30 communicates signals to and from mobile device 20 and manages the local operation of a base station controller 32. The wireless link between mobile device 20 and base station 30 is typically a radio frequency link that may be cellular in network organization. Base station 30 may include transmission equipment suitable for transmitting transmit signal 15 to mobile device 20. Transmit signal 15 may comprise any suitable signal modulated by a carrier, and may include data packets communicating information such as data, voice, video, multimedia, any other suitable type of information, or any combination of the preceding. According to one embodiment, base station 30 may include an antenna that transmits transmit signal 15 to mobile device 20 in order for mobile device 20 to decode the information encoded in transmit signal 15.

Communication network 40 may comprise all or a portion of a global computer network such as the Internet, an extranet, a corporate Virtual Private Network (VPN), a local area network (LAN), a metropolitan area network (MAN), a wide area networks (WAN), a SONET/SDH based network, or any other suitable communication or telecommunication network. According to one embodiment, communication network 40 may comprise a private network that links base stations 30 of communication system 10.

Figure 2:
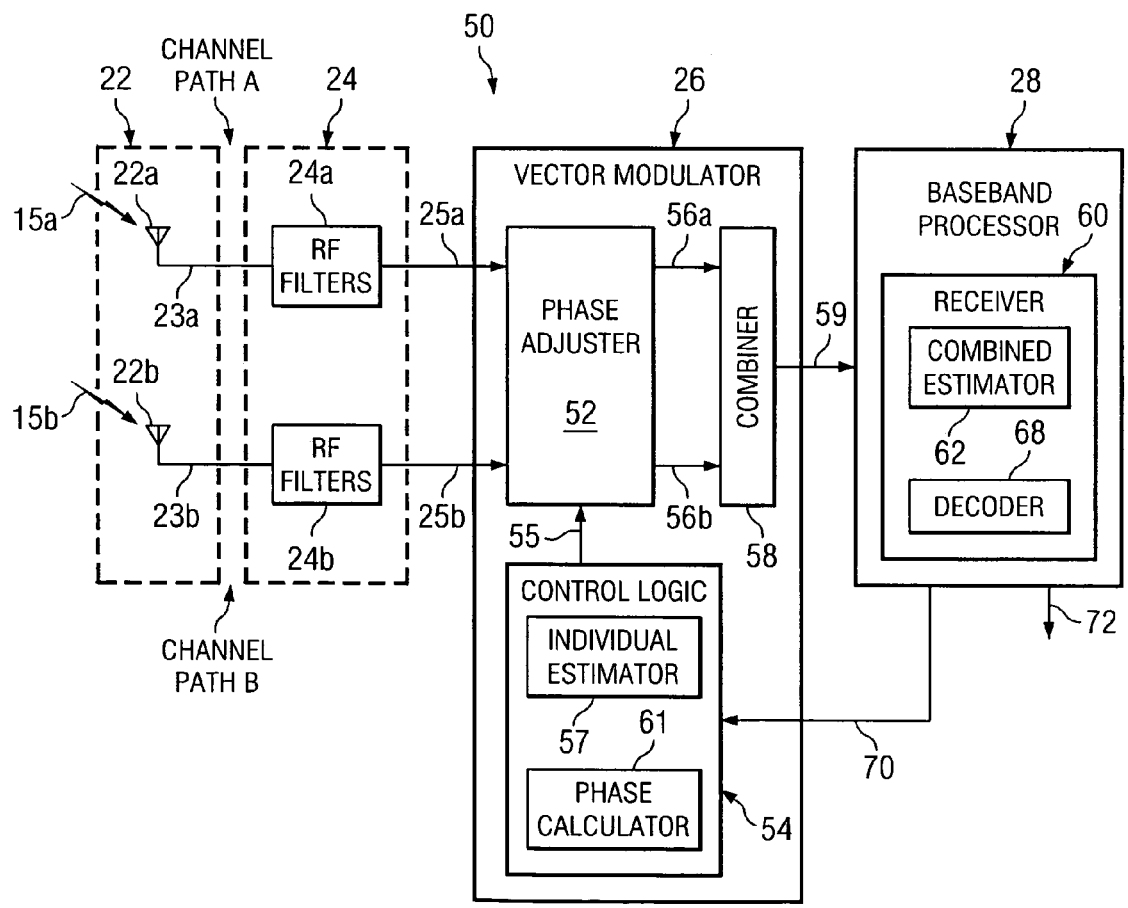
FIG. 2 is a block diagram of one embodiment of a diversity antenna system that may be used in accordance with the present invention.

A block diagram of an embodiment of a diversity antenna system of mobile device 20 is described with reference to FIG. 2. A block diagram of an embodiment of a vector modulator that may be used with the diversity antenna receiver of FIG. 2 is described with reference to FIG. 3. A flowchart illustrating one embodiment of a method for processing diversity signals at a mobile device is described with reference to FIG. 4. As used in this document, "each" refers to each member of a set or to each member of a subset of the set.

FIG. 2 is a block diagram of an embodiment of a diversity antenna system 50 that may be used with mobile device 20. Diversity antenna system 50 includes receive antennas 22, radio frequency (RF) filters 24, a vector modulator 26, and a baseband processor 28 coupled as shown in FIG. 2. In operation, receive antennas 22 detect transmit signal 15 as multipath signals 15a and 15b, which are filtered by RF filters 24 and adjusted by vector modulator 26. Baseband processor 28 decodes information 72 and estimates a phase adjustment that vector modulator 26 may use to adjust subsequent multipath signals detected at diversity antenna system 50.

According to the illustrated embodiment, base station 30 transmits transmit signal 15. Transmit signal 15 x(t) may be described by Equation (1):

$$x(t)=\sqrt{E_s}b(t)c(t) \quad (1)$$

where $\sqrt{E_s}$ represents transmitted power, s represents a transmitted symbol, b(t) represents the total data signal modulated by base station 30, which may include the pilot channel and the user traffic channels, and c(t) represents the composite pseudo noise (PN) sequence signal.

The channels share the same propagation paths, so optimizing each traffic channel may be equivalent to optimizing the pilot channel. In addition, the channels are typically mutually orthogonal, so for purposes of this description, only the pilot channel is considered and the traffic channels are dropped. Accordingly, Equation (1) may be re-written as Equation (1a):

$$x(t)=\sqrt{E_s}p(t)c(t) \quad (1a)$$

where p(t) represents the pilot channel waveform. Each element of diversity antenna system 50 receives transmit signal 15 as multipath signals 15a and 15b. Multipath signals 15a and 15b may each be modeled as the result of a tapped delay line model, where each multipath signal 15a and 15b includes characteristics introduced by a wireless environment. For example, transmit signal 15 may have been transformed by the introduction of delays, fading, interference, or noise to yield multipath components 15a and 15b. Diversity antenna system 50 may detect more than two multipath signals 15a and 15b without departing from the scope of the invention.

Receive antennas 22 receive multipath signals 15a and 15b and generate diversity signals 23 from multipath signals 15a and 15b. According to one embodiment, each receive antenna 22 may be similar to or different from each other. For example, antenna 22a may be an internal printed antenna, while receive antenna 22b may be an external stubby antenna. Any other suitable type of antenna may be used as receive antennas 22, for example, wipe antennas, patch antennas, or magnetic antennas may be used. Receive antennas 22 may have any suitable configuration. According to one embodiment, receive antennas 22 may be spatially separated to allow each receive antenna 22 to receive multipath signals 15a and 15b at a wavelength separation suitable for distinguishing multipath signal 15a from multipath signal 15b According to the illustrated embodiment, each receive antenna 22 is associated with a channel path. For example, receive antenna 22a is associated with a channel path A, and receive antenna 22b is associated with channel path B. Receive antennas 22 generate a diversity signal 23 for each channel path. For example, receive antenna 22a generates diversity signal 23a for channel path A, and receive antenna 22b generates diversity signal 23b for channel path B.

RF filters 24 filter receive diversity signals 23 to yield filtered signals 25. According to the illustrated embodiment, diversity signal 23a is filtered by RF filter 24a, and diversity signal 23b is filtered by RF filter 24b. According to one embodiment, RF filters 24 include duplexors and diplexors. In general, a duplexor comprises a filter that filters signals according to the frequency separation of the transmit and receive frequencies, which may allow a transmitter and receiver to use a common antenna. According to one embodiment, duplexors at RF filters 24 may be configured to filter receive frequencies of diversity signals 23. A diplexor may comprise a switch, a filter, or any suitable device for separating signal frequencies according to different frequency bands. According to one embodiment, a diplexor separates diversity signals 23 to obtain a particular frequency band at which the mobile device 20 operates. Examples of frequency bands include the 800 MHz band and the 1.9 GHz band. Such diplexor operation may be useful for mobile devices 20 capable of operating in dual band systems. Other filters may be used as RF filters 24 without deviating from the scope of the invention. Any suitable number of antennas 22 may be used in combination with any suitable number of RF filters 24 to produce any suitable number of filtered signals 25 for processing by diversity antenna system 50.

Vector modulator 26 determines individual channel gain estimates for each individual channel path, calculates a phase adjustment for each channel path, adjusts the phase of filtered signals 25 of the channel paths to yield adjusted signals 56, and combines adjusted signals 56 to yield a combined signal 59. According to the illustrated embodiment, vector modulator 26 includes a phase adjuster 52, control logic 54, and a combiner 58 coupled as shown. Control logic 54 includes an individual channel estimator 57 and a phase calculator 61. Individual channel estimator 57 determines individual channel gain estimates for each individual channel path, and phase calculator 61 calculates the phase adjustments for each individual channel path from the individual channel gain estimates. Phase adjuster 52 adjusts the phase of filtered signals 25 according to the phase adjustments. According to the illustrated embodiment, phase adjuster 52 applies a weight $w_m$ to filtered signal 25 of antenna m. The weight $w_m(n)$ for antenna m at symbol interval n of the time domain may be described by Equation (2):

$$w_m(n) = \frac{1}{\sqrt{2}} e^{j\theta_m(n)} \qquad (2)$$

where $\theta_m(n)$ represents the phase adjustment for antenna m for symbol interval n and j represents $\sqrt{-1}$. Vector modulator 26 and the application of the phase adjustment $\theta_m(n)$ is more particularly described with reference to FIG. 3.

After phase adjuster 52 adjusts the phase of each of the filtered signals 25, combiner 58 combines adjusted signals 56 to yield combined signal 59 that is further processed by baseband processor 28. Vector modulator 26 may include more or fewer modules without departing from the scope of the invention. For example, control logic 54 may be colocated with phase adjuster 52. As another example, vector modulator 26 may perform other suitable adjustments of filtered signals 25, such as providing power amplification for filtered signals 25.

Baseband processor 28 processes combined signal 59 to yield information 72 and to generate estimation signal 70. According to the illustrated embodiment, baseband processor 28 includes a receiver 60, a combined channel estimator 62, and a decoder 68 configured as shown. Receiver 60 despreads desired traffic channel from the combined signal 59 to generate finger signals that may be weighted and combined according to maximal ratio combining (MRC) techniques to yield a weighted signal that is associated with transmit signal 15. Decoder 68 decodes the weighted signal in order to yield information 72. Receiver 60 may use any other suitable technique for weighing and combining the finger signals. For example, receiver 60 may use Equal Gain Combining (EGC) to weigh and combine the finger signals.

Combined channel estimator 62 generates estimation signal 70 that may include combined complex channel gain estimate information for the combined channel paths. According to one embodiment, combined channel estimator 62 may use the pilot symbols derived from a pilot signal transmitted by base station 30 to determine the complex channel gain estimates. Combined channel estimator 62 may operate in conjunction with individual channel estimator 57.

According to the embodiment, a complex baseband impulse response $h_m(t)$ for the channel path between receive antenna m and the transmit antenna at time t may be defined by Equation (3):

$$h_m(t) = \sum_{l=0}^{L-1} h_{m,l}(t)\delta(t - lT_c) \qquad (3)$$

where $T_c$ represents the chip duration, $h_{m,l}(t)$ represents the complex channel gain estimate for a receive antenna m during one symbol interval, l represents the index of multipath signals for a receive antenna m, and L represents the maximum number of multipath signals that a system may process. An arbitrary power delay profile is assumed to have a maximum delay $LT_c$. Because $h_{m,l}(t)$ is assumed to be constant during one system interval but to vary from symbol to symbol, a discrete time variable $h_{m,l}(n)$ may be used to represent the complex channel gain $h_{m,l}(t)$, where n represents a symbol interval in the time domain. According to another embodiment, complex channel gain $h_{m,l}(n)$ may be modeled as a complex zero mean Gaussian random variable with variance $\delta_l^2$.

After processing at combiner 58, the effective channel response at baseband 28 may be expressed by Equation (4):

$$\alpha_{m,l}(n) = \sum_{m=0,1} w_m(n) h_{m,l}(n) \qquad (4)$$

Combined channel estimator 62 determines complex channel gain estimates $h_{m,l}(n)$ from the despreaded pilot signal symbols to coherently combine the finger signals. According to one embodiment, the symbol representation $y_l(n)$ of pilot channel l after despreading may be described by Equation (5):

$$y_l(n) = \sqrt{E_s} \sum_{m=0,1} w_m(n) h_{m,l}(n) b(n) + \eta_l(n) = \sqrt{E_s} \, \alpha_{m,l}(n) b(n) + \eta_l(n) \qquad (5)$$

where $$\alpha_{m,l}(n) = \sum_{m=0,1} w_m(n) h_{m,l}(n)$$

represents the effective fading as seen by baseband processor 28, $\eta_l(n)$ represents the noise term which may include complex zero mean Gaussian random variables with variance $\sigma^2$, and b(n) represents the data signal including symbol information. The noise term $\eta_l(n)$ may include interference from other CDMA signals modeled as white Gaussian noise.

The symbol representation $y_l(n)$ described by Equation (5) may be represented in matrix form as described by Equation (5a):

$$Y_l = B\Gamma_l + N_l \qquad (5a)$$

where vector $Y_l$ corresponds to symbol representation $y_l(n)$, vectors B corresponds to pilot data signal p(n), vectors $\Gamma_l$ corresponds to complex channel gain estimate $h_{m,l}(n)$, and vector $N_l$ corresponds to noise term $\eta_l(n)$. For Equation (5), a unity symbol energy is assumed, and transmitted power $\sqrt{E_s}$ is dropped.

Vector $Y_l$ associated with symbol representation $y_l(n)$ may be described by:

$$Y_l = (y_l(0) y_l(1) \ldots y_l(K-1)))^T$$

Vectors B associated with data signal p(n) may be described by $B=(B_0 B_1)$ and:

$$B_m = \mathrm{diag}(w_m(0)p(0) w_m(1)p(1) \ldots w_m(K-1)p(K-1))$$

Vectors $\Gamma_l$ associated with complex channel gain $h_{m,l}(n)$ may be described by:

$$\Gamma_l = (\Gamma_{0l} \Gamma_{1l})^T \text{ and } \Gamma_{ml} = (h_{ml}(0) h_{ml}(1) \ldots h_{ml}(K-1)))$$

Vector N associated with noise term $\eta_l(n)$ may be described by:

$$N_l = (\eta_l(0) \eta_l(1) \ldots \eta_l(K-1)))^T$$

where superscript $^T$ represents a matrix transpose, and K is total number of samples used for channel estimation. For example, K may be equal to 2. Diag (x1, x2, ... xn) represents the diagonal matrix with elements {x1, x2, ... xn}.

Combined channel estimator 62 may perform minimum and mean square error (MMSE) channel estimation according to Equation (5a) to obtain the linear form of an estimated complex channel gain $\hat{\Gamma}_l$ as described by Equation (6):

$$\hat{\Gamma}_l = \Theta B (B \Theta B + \sigma^2 I) Y_l \tag{6}$$

where $$\Theta = \begin{pmatrix} Q & 0 \\ 0 & Q \end{pmatrix},$$

and I is the identity matrix, and Q represents the covariance matrix of the complex fading for each channel path. The n1th row and n2th column elements q of covariance matrix Q may be described by Equation (7):

$$q_{ij} = E[h_{ml}(i) h_{ml}^*(j)] = J_0(2\pi f_d T) \tag{7}$$

where E[x] represents the mean of x, $J_0$ represents the 0th order Bessel function, and $f_d$ represents the Doppler spread of the channel, which may be determined according to the mobile speed and carrier frequency.

Vector modulator 26 may use estimated complex channel gain $\hat{\Gamma}_l$ to calculate the phase adjustment $\theta_m(n)$ as is described with reference to FIG. 3. According to the illustrated embodiment, combined channel estimator 62 forwards an estimation signal 70 that includes the combined complex channel gain estimate to vector modulator 26. Estimation signal 70 may include any other suitable estimate without departing from the scope of the invention.

According to one embodiment, baseband processor 28 and control logic 54 may be embodied in one or more processing devices such that the one or more processing devices perform the operations of baseband processor 28 and control logic 54. A processing device may comprise any device operable to accept input and process the input according to predefined rules to produce an output.

Modifications, additions, or omissions may be made to diversity antenna system 50 without departing from the scope of the invention. As an example, baseband processor 28 may perform additional processing of combined signal 59. As another example, phase adjustments may be introduced into signals at base station 30, and the mobile device 20 may determine the channel estimates according to the phase offsets. As yet another example, diversity antenna system 50 may include more antennas 22 for receiving any suitable number of diversity signals 23. Moreover, the operations of diversity antenna system 50 may be performed by more or fewer modules. Additionally, functions may be performed using any suitable logic comprising software, hardware, other logic, or any suitable combination of the preceding.

Figure 3:
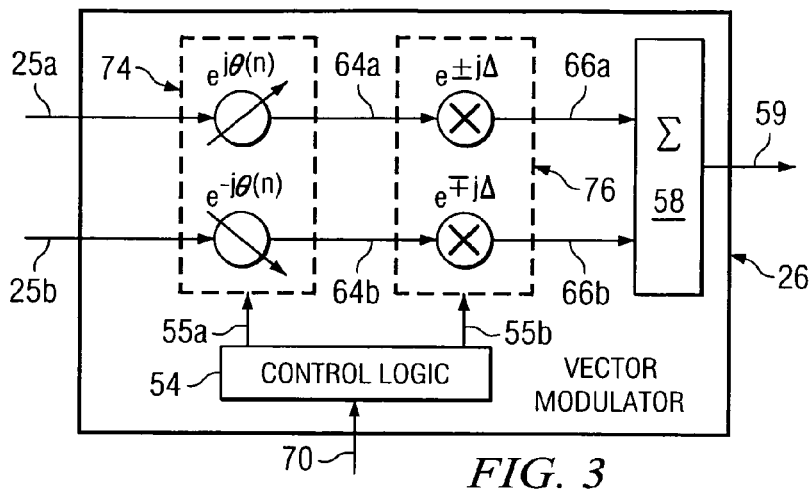
FIG. 3 is a block diagram of one embodiment of a vector modulator that may be used with the diversity antenna system of FIG. 2.

FIG. 3 is a diagram of an embodiment of a vector modulator 26 that may be used with diversity antenna system 50 of FIG. 2. According to the illustrated embodiment, vector modulator 26 receives filtered signals 25 and estimation signal 70 to generate combined signal 59. Vector modulator 26 includes control logic 54, a first phase adjuster 74, a second phase adjuster 76, and combiner 58. Control logic 54 receives estimation signal 70 and calculates the phase adjustment $\theta_m(n)$ that may be applied to filtered signals 25 by first phase adjuster 74 and second phase adjuster 76. The second adjusted signals 66 may then be combined by combiner 58 to generate combined signal 59.

Control logic 54 calculates phase adjustment $\theta_m(n)$ according to the estimated complex channel gain $\hat{\Gamma}_l$. According to the illustrated embodiment, control logic 54 may extract estimated complex channel gain components $\hat{h}_{m,l}(n)$ according to Equation (6). If perfect channel state information is known, the decision statistics z(n) after MRC combining at baseband processor 28 may be described by Equation (8):

$$z(n) = \sum_{l=0}^{L-1} \hat{\alpha}_{m,l}^*(n) y_l(n) \tag{8}$$

where the term $\hat{\alpha}_{m,l}(n)$ represents the estimate of the effective fading as seen by the baseband processor 28 defined by $$\hat{\alpha}_{m,l}(n) = \sum_{m=0,1} w_m(n) \hat{h}_{m,l}(n),$$

where $\hat{h}_{m,l}(n)$ is an estimate of $h_{m,l}(n)$.

According to Equation (8), if the second phase adjustment is not considered, the mean E[z(n)] and variance var(z(n)) of decision statistics z(n) may be described by Equations (9) and (10), respectively:

$$E[z(n)] = \frac{1}{2} \sum_{l=0}^{L-1} (|h_{0l}(n)|^2 + |h_{1l}(n)|^2) + \lambda^2 \cos(\phi(n) + \varphi(n)) \tag{9}$$

and $$\text{var}(z(n)) = \left\{ \frac{1}{2} \sum_{l=0}^{L-1} (|h_{0l}(n)|^2 + |h_{1l}(n)|^2) + \lambda^2 \cos(\phi(n) + \varphi(n)) \right\} \sigma^2 \tag{10}$$

where $\phi(n)$ represents the relative phase shift, and the term $\lambda^2$ is defined by:

$$\lambda^2 = \sqrt{\left( \sum_{l=0}^{L-1} |h_{0l}(n)||h_{1l}(n)|\cos(\Phi_l(n)) \right)^2 + \left( \sum_{l=0}^{L-1} |h_{0l}(n)||h_{1l}(n)|\sin(\Phi_l(n)) \right)^2}.$$

The term $\varphi(n)$ is described by Equation (11):

$$\varphi(n) = \tan^{-1} \left( \frac{\left( \sum_{l=0}^{L-1} |h_{0l}(n)||h_{1l}(n)|\sin(\Phi_l(n)) \right)^2}{\left( \sum_{l=0}^{L-1} |h_{0l}(n)||h_{1l}(n)|\cos(\Phi_l(n)) \right)^2} \right) \tag{11}$$

where the phase difference $\Phi_l(n)$ is described by $\Phi_l(n) = \angle(h_{0l}(n)) - \angle(h_{1l}(n))$.

The relative phase shift $\phi(n)$ may be represented by $\phi(n) = \theta_0(n) - \theta_1(n)$, where phase $\theta_0(n)$ is associated with the phase adjustment of filtered signal 25*a*, and phase $\theta_l(n)$ is associated with the phase adjustment of filtered signal 25*b*. Using Equa tions (9) and (10), the signal-to-noise ratio SNR of the decision statistics z(n) may be described by Equation (12):

$$SNR \triangleq \frac{(E[z(n)])^2}{\text{var}(z(n))} = \frac{\frac{1}{2}\sum_{l=0}^{L-1}(|h_{0l}(n)|^2 + |h_{1l}(n)|^2) + \lambda^2\cos(\phi(n)+\varphi(n))}{\sigma^2} \quad (12)$$

The maximum signal-to-noise ratio of the channel paths of diversity antenna system 50 may be achieved when the relative phase shift φ(n) is optimal as described by Equation (13):

$$\phi_{opt}(n) = -\varphi(n) = -\tan^{-1}\left(\frac{\left(\sum_{l=0}^{L-1}|h_{0l}(n)||h_{1l}(n)|\sin(\Phi_l(n))\right)^2}{\left(\sum_{l=0}^{L-1}|h_{0l}(n)||h_{1l}(n)|\cos(\Phi_l(n))\right)^2}\right) \quad (13)$$

To reflect the optimal signal to noise ration $SNR_{opt}$, Equation (12) may be rewritten as Equation (14):

$$SNR_{opt} = \frac{\frac{1}{2}\sum_{l=0}^{L-1}(|h_{0l}(n)|^2 + |h_{1l}(n)|^2) + \lambda^2}{\sigma^2} \quad (14)$$

Control logic 54 may use Equation (13) to calculate a first phase adjustment θ(n) as described by Equation (15):

$$\theta(n) = \frac{\hat{\phi}_{opt}(n)}{2} \quad (15)$$

where θ(n) may also be described as an optimum phase based on the complex channel estimates. The calculation of Equations (13) and (15) are based on channel estimates $\{h_{ml}(n)\}$. Channel estimates $\{h_{ml}(n)\}$ are estimated according to Equation (6), and the accuracy of channel estimates $\{h_{ml}(n)\}$ depends on the second phase adjustment.

Control logic 54 may also identify a second phase adjustment Δ. If the channel estimation error and the second phase adjustments are considered, the signal to noise ratio of the combined signal may be written as Equation (16):

$$SNR = \frac{\frac{1}{2}\sum_{l=0}^{L-1}(|h_{01}(n)|^2 + |h_{1l}(n)^2|) + \lambda^2\cos^2\Delta}{\sigma^2 + \sigma_e^2} \quad (16)$$

where $\sigma_e^2$ represents noise caused by channel estimation error. Noise $\sigma_e^2$ monotonically decreases when Δ increases from 0 degree to 90 degree. According to one embodiment, second phase adjustment Δ determines an estimation error that corresponds to a phase offset identified by field tests. The second phase adjustment Δ may correspond to a maximum overall signal-to-noise ratio. The second phase adjustment may include any phase offset in the range of three degrees and thirty degrees. According to one embodiment, the second phase offset comprises five degrees.

From the results of the first phase adjustment θ(n) given by Equation (15) and the identified second phase adjustment Δ, control logic 54 may calculate the phase adjustment $\theta_m(n)$ for antenna m as described by Equation (17):

$$\theta_m(n) = (-1)^m \theta(n) + (-1)^{m+n}\Delta \quad (17)$$

According to the illustrated embodiment, first phase adjuster 74 and second phase adjuster 76 apply the phase adjustment $\theta_m(n)$ in the form of a weight $w_m$, as described by Equation (2). For example, first phase adjuster 74 receives a first adjustment signal 55a from control logic 54 that instructs first phase adjuster 74 to apply the first phase adjustment θ(n) to filtered signals 25 to yield first phase adjusted signals 64. First adjustment signal 55a may include the first phase adjustment θ(n) and the associated weight $e^{\pm j\theta(n)}$. According to the illustrated embodiment, filtered signal 25a is adjusted by first phase adjuster 74 according to the weight $e^{j\theta(n)}$, while filtered signal 25b is adjusted by first phase adjuster 74 according to the weight $e^{-j\theta(n)}$.

Second phase adjuster 76 receives a second adjustment signal 55b from control logic 54 that instructs second phase adjuster 76 to apply the second phase adjustment Δ to first phase adjusted signals 64 to yield second phase adjusted signals 66. Second phase adjustment signal 55b may include the identified phase shift corresponding to the second phase adjustment Δ and the associated weight $e^{j\Delta}$. According to the illustrated embodiment, second phase adjuster 76 adjusts first phase adjusted signal 64a according to the weight $e^{\pm j\Delta}$, while second phase adjuster 76 adjusts first adjusted signal 64b according to the weight $e^{\pm j\Delta}$. Although the functions of first phase adjuster 74 and second phase adjuster 76 have been described as separate functions, first phase adjuster 74 and second phase adjuster 76 may be performed by the same module. Additionally, first phase adjuster 74 and second phase adjuster 76 may perform the adjustments simultaneously. Combiner 58 receives the second phase adjusted signals 66 and adds them to yield combined signal 59 as was described with reference to FIG. 2.

Modifications, additions, or omissions may be made to vector modulator 26 without departing from the scope of the invention. For example, first phase adjuster 74 and second phase adjuster 76 may perform their corresponding functions simultaneously. As another example, vector modulator 26 may perform other suitable adjustments of filtered signals 25. Although vector modulator 26 has been described as performing only phase adjustments, vector modulator 26 may perform complex amplitude adjustments of filtered signals 25 without departing from the scope of the invention. As yet another example, vector modulator 26 may adjust any suitable number of filtered signals 25 without departing from the scope of the invention. Moreover, the operations of vector modulator 26 may be performed by more or fewer modules. Additionally, functions may be performed using any suitable logic comprising software, hardware, other logic, or any suitable combination of the preceding.

Figure 4:
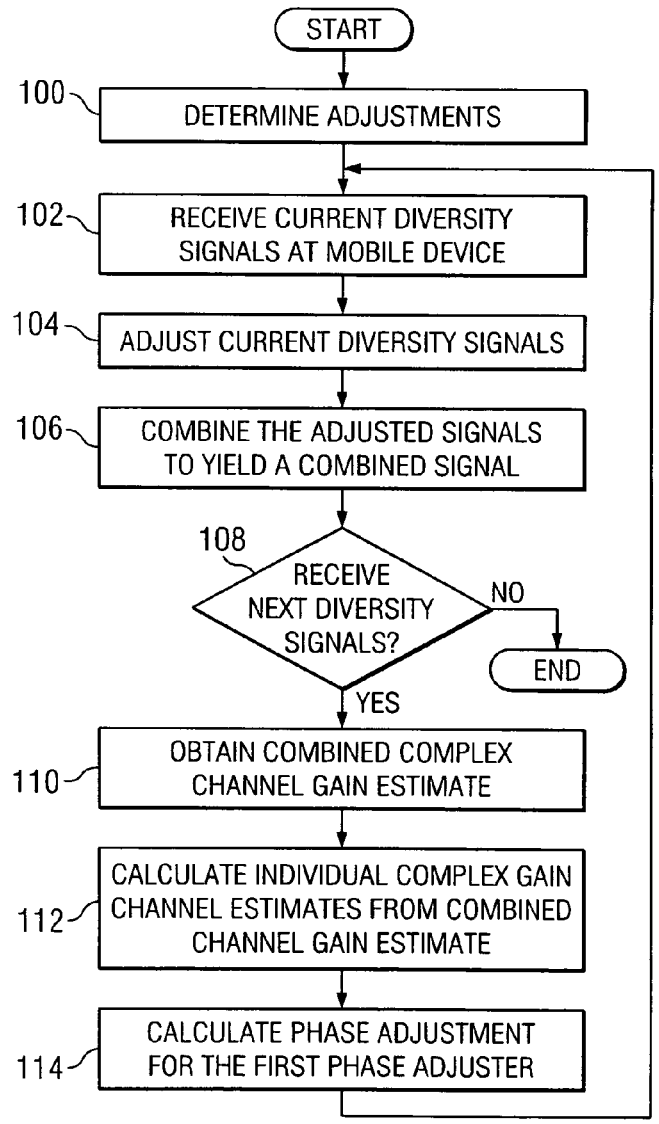
FIG. 4 is a flowchart illustrating one embodiment of a method for processing diversity signals at a mobile device in accordance with the present invention.

FIG. 4 is a flowchart illustrating one embodiment of a method for processing diversity signals at a mobile device in accordance with the present invention. The method begins at step 100, where mobile device 20 determines adjustments. The phase adjustment θ(n) for the first phase adjuster 74 may be calculated from one or more previous symbol intervals such as the two previous symbol intervals. The phase offset Δ for second phase adjuster 76 may be based on experiment. For example, the phase offset may set to 10 to 20 degrees such as approximately 15 degrees. The total phase adjustment $\theta_m(n)$ may be calculated according to Equation (17).

Mobile device 20 receives diversity signals at step 102 for one or more symbol intervals. According to one embodiment, each antenna 22 of mobile device 20 detects and receives diversity signals 23 during two symbol intervals n=1, 2. Phase adjuster 52 adjusts current diversity signals 25 according to the adjustments at step 104. At step 106, combiner 58 combines the adjusted signals to yield a combined signal 59. Combined signal 59 is passed to baseband for further processing.

The method proceeds to step 108, where it is determined if a next group of diversity signals has been received. According to the example, a next group of diversity signals 23 is associated with the next two symbol interval n=3, 4. If a next group of diversity signals 23 has been received, the method proceeds to step 110, where vector modulator 26 obtains combined complex channel gain estimates from baseband processor 28. Baseband processor 28 determines a combined complex channel gain estimate for the diversity signals. As was described with reference to FIG. 2, combined channel estimator 62 determines the combined complex channel gain estimate using the pilot symbol signal, which may be part of transmit signal 15. According to one embodiment, combined channel estimator 62 provides the combined complex channel gain estimate to vector modulator 26 using estimation signal 70.

Vector modulator 26 calculates the individual complex channel gain estimates from the combined channel gain estimates at step 112. Control logic 54 of vector modulator 26 may determine the complex channel gain components $h_{m,i}(n)$ according to Equation (6), as described with reference to FIG. 3. According to the embodiment, baseband processor 28 receives combined signal 59, which is processed by a receiver 60. Receiver 60 may include a RAKE receiver that despreads combined signal 59 into symbol level signals that may be used by combined channel estimator 62 to generate a combined complex channel gain estimate. Additionally, decoder 68 may decode a weighted signal from a signal combiner 58 at receiver 60 in order to yield information 70.

The method proceeds to step 114, where phase adjustment for the first phase adjuster 74 is calculated based on the individual complex channel gain estimates and the corresponding complex weight $w_m$ is calculated according to Equation (2). The obtained complex weight may be applied to received diversity signals at step 104. If no next diversity signals 23 have been received step 108, the method terminates.

Steps may be added, omitted, modified, or performed in any suitable order without departing from the scope of the invention. For example, a step may be added where diversity signals 23 are filtered before vector modulator 26 applies the phase adjustment at step 108.

Certain embodiments of the invention may provide one or more technical advantages. A technical advantage of one embodiment may be that using a single RAKE receiver at the mobile device may reduce the size, cost and, complexity of the mobile device compared with a multiple RAKE receiver mobile device. Another technical advantage of an embodiment may be that by adjusting the phase of the diversity signals using a complex channel gain estimate may eliminate the need for periodic training which may result in the effective use of conventional Code Division Multiple Access (CDMA) protocols. Yet another technical advantage of an embodiment may be that the average performance of a diversity antenna mobile device may be significantly improved compared with a single antenna mobile device.

Although an embodiment of the invention and its advantages are described in detail, a person skilled in the art could make various alterations, additions, and omissions without departing from the spirit and scope of the present invention as defined by the appended claims.

What is claimed is:

1. A method for processing diversity signals, comprising:
   receiving a first plurality of diversity signals at a plurality of antennas, the first plurality of diversity signals comprising communicated information, the plurality of antennas associated with a plurality of channel paths;
   adjusting a phase of each diversity signal of at least a subset of the first plurality of diversity signals;
   combining the first plurality of diversity signals to form a combined signal;
   processing the combined signal to yield the communicated information;
   determining a combined complex channel gain estimate of the first plurality of diversity signals from the combined signal;
   calculating an individual complex channel gain estimate for each of the plurality of antennas from the combined complex channel gain estimate;
   establishing a plurality of phase adjustments associated with the plurality of channel paths according to the plurality of individual complex channel gain estimates;
   applying the plurality of phase adjustments to a second plurality of diversity signals, the second plurality of diversity signals comprising next communicated information; and
   processing the second plurality of diversity signals to yield the next communicated information,
   wherein a phase adjustment of the plurality of phase adjustments comprises a first phase adjustment and a second phase adjustment, the first phase adjustment based on an individual complex channel gain estimate, the second phase adjustment based on a signal-to-noise ratio.

2. The method of claim 1, wherein:
   the first plurality of diversity signals has a number of time intervals; and
   the second plurality of diversity signals has the same number of time intervals, the number of time intervals being greater than or equal to the number of the plurality of antennas.

3. The method of claim 1, wherein processing the combined signal to yield the communicated information further comprises:
   despreading a traffic channel embedded in the combined signal to form a plurality of finger signals, a finger signal corresponding to a multipath component of the combined signal;
   weighting each finger signal to yield a plurality of weighted finger signals;
   combining the plurality of weighted finger signals to yield a combined finger signal; and
   decoding the combined finger signal to determine the communicated information.

4. The method of claim 1, wherein determining the combined complex channel gain estimate of the first plurality of diversity signals from the combined signal further comprises:
   despreading a pilot channel embedded in the combined signal to form a plurality of finger signals, a finger signal corresponding to a multipath component of the combined signal; and
   determining the combined complex channel gain estimate from the plurality of finger signals.

5. The method of claim 1, wherein calculating the individual complex channel gain estimate for each of the plurality of antennas from the combined complex channel gain estimate further comprises:
   determining a covariance matrix for each channel path of the plurality of channel paths; and calculating an individual complex channel gain estimate associated with each of the plurality of antennas according to covariance matrix minimum and mean square error (MMSE) criteria.

6. The method of claim 1, wherein calculating the individual complex channel gain estimate for each of the plurality of antennas from the combined complex channel gain estimate further comprises assuming a complex channel to be constant over a duration of the first plurality of diversity signals.

7. A method for processing diversity signals, comprising:
receiving a first plurality of diversity signals at a plurality of antennas, the first plurality of diversity signals comprising communicated information, the plurality of antennas associated with a plurality of channel paths;
adjusting a phase of each diversity signal of at least a subset of the first plurality of diversity signals;
combining the first plurality of diversity signals to form a combined signal;
processing the combined signal to yield the communicated information;
determining a combined complex channel gain estimate of the first plurality of diversity signals from the combined signal;
calculating an individual complex channel gain estimate for each of the plurality of antennas from the combined complex channel gain estimate;
establishing a plurality of phase adjustments associated with the plurality of channel paths according to the plurality of individual complex channel gain estimates;
applying the plurality of phase adjustments to a second plurality of diversity signals, the second plurality of diversity signals comprising next communicated information; and
processing the second plurality of diversity signals to yield the next communicated information, wherein:
each phase adjustment of the plurality of phase adjustments comprises a first phase adjustment and a second phase adjustment, each second phase adjustment having a magnitude and a sign; and
establishing the plurality of phase adjustments associated with the plurality of channel paths according to the plurality of individual complex channel gain estimates further comprises:
calculating the plurality of first phase adjustments;
determining the magnitudes of the plurality of second phase adjustments;
alternating the signs of the second phase adjustments for each time interval of a plurality of time intervals and for each channel path of the plurality of channel paths; and
adding the first phase adjustments and the second phase adjustments to yield the plurality of phase adjustments.

8. A method for processing diversity signals, comprising:
receiving a first plurality of diversity signals at a plurality of antennas, the first plurality of diversity signals comprising communicated information, the plurality of antennas associated with a plurality of channel paths;
adjusting a phase of each diversity signal of at least a subset of the first plurality of diversity signals;
combining the first plurality of diversity signals to form a combined signal;
processing the combined signal to yield the communicated information;
determining a combined complex channel gain estimate of the first plurality of diversity signals from the combined signal;
calculating an individual complex channel gain estimate for each of the plurality of antennas from the combined complex channel gain estimate;
establishing a plurality of phase adjustments associated with the plurality of channel paths according to the plurality of individual complex channel gain estimates;
applying the plurality of phase adjustments to a second plurality of diversity signals, the second plurality of diversity signals comprising next communicated information, and
processing the second plurality of diversity signals to yield the next communicated information, wherein;
each phase adjustment of the plurality of phase adjustments comprises a first phase adjustment and a second phase adjustment, each second phase adjustment having a magnitude and a sign; and
establishing the plurality of phase adjustments associated with the plurality of channel paths according to the plurality of individual complex channel gain estimates further comprises:
calculating the plurality of first phase adjustments;
determining the magnitudes of the plurality of second phase adjustments;
changing the second phase adjustments for each time interval of a plurality of time intervals and for each channel path of a plurality of channel paths such that the following are satisfied:
for each time interval, the second phase adjustments for at least two channel paths are different; and
for each channel path, the second phase adjustments for at least two time intervals are different; and
adding the first phase adjustments and the second phase adjustments to yield the plurality of phase adjustments.

9. A system for processing diversity signals, comprising:
a vector modulator operable to receive a first plurality of diversity signals at a plurality of antennas, the first plurality of diversity signals comprising communicated information, the plurality of antennas associated with a plurality of channel paths; and
one or more processing devices coupled to the vector modulator and operable to:
adjust a phase of each diversity signal of at least a subset of the first plurality of diversity signals;
combine the first plurality of diversity signals to form a combined signal;
process the combined signal to yield the communicated information;
determine a combined complex channel gain estimate of the first plurality of diversity signals from the combined signal;
calculate an individual complex channel gain estimate for each of the plurality of antennas from the combined complex channel gain estimate; and
establish a plurality of phase adjustments associated with the plurality of channel paths according to the plurality of individual complex channel gain estimates;
the vector modulator further operable to apply the plurality of phase adjustments to a second plurality of diversity signals, the second plurality of diversity signals comprising next communicated information; and the one or more processing devices further operable to process the second plurality of diversity signals to yield the next communicated information, wherein a phase adjustment of the plurality of phase adjustments comprises a first phase adjustment and a second phase adjustment, the first phase adjustment based on an individual complex channel gain estimate, the second phase adjustment based on a signal-to-noise ratio.

10. The system of claim 9, wherein:
the first plurality of diversity signals has a number of time intervals; and
the second plurality of diversity signals has the same number of time intervals, the number of time intervals being greater than or equal to the number of the plurality of antennas.

11. The system of claim 9, wherein the one or more processing devices are further operable to process the combined signal to yield the communicated information by:
despreading a traffic channel embedded in the combined signal to form a plurality of finger signals, a finger signal corresponding to a multipath component of the combined signal;
weighting each finger signal to yield a plurality of weighted finger signals;
combining the plurality of weighted finger signals to yield a combined finger signal; and
decoding the combined finger signal to determine the communicated information.

12. The system of claim 9, wherein the one or more processing devices are further operable to determine the combined complex channel gain estimate of the first plurality of diversity signals from the combined signal by:
despreading a pilot channel embedded in the combined signal to form a plurality of finger signals, a finger signal corresponding to a multipath component of the combined signal; and
determining the combined complex channel gain estimate from the plurality of finger signals.

13. The system of claim 9, wherein the one or more processing devices are further operable to calculate the individual complex channel gain estimate for each of the plurality of antennas from the combined complex channel gain estimate by:
determining a covariance matrix for each channel path of the plurality of channel paths; and
calculating an individual complex channel gain estimate associated with each of the plurality of antennas according to covariance matrix minimum and mean square error (MMSE) criteria.

14. The system of claim 9, wherein the one or more processing devices are further operable to calculate the individual complex channel gain estimate for each of the plurality of antennas from the combined complex channel gain estimate by assuming a complex channel to be constant over a duration of the first plurality of diversity signals.

15. A system for processing diversity signals, comprising:
a vector modulator operable to receive a first plurality of diversity signals at a plurality of antennas, the first plurality of diversity signals comprising communicated information, the plurality of antennas associated with a plurality of channel paths; and
one or more processing devices coupled to the vector modulator and operable to:
adjust a phase of each diversity signal of at least a subset of the first plurality of diversity signals;
combine the first plurality of diversity signals to form a combined signal;
process the combined signal to yield the communicated information;
determine a combined complex channel gain estimate of the first plurality of diversity signals from the combined signal;
calculate an individual complex channel gain estimate for each of the plurality of antennas from the combined complex channel gain estimate; and
establish a plurality of phase adjustments associated with the plurality of channel paths according to the plurality of individual complex channel gain estimates;
the vector modulator further operable to apply the plurality of phase adjustments to a second plurality of diversity signals, the second plurality of diversity signals comprising next communicated information; and
the one or more processing devices further operable to process the second plurality of diversity signals to yield the next communicated information, wherein:

each phase adjustment of the plurality of phase adjustments comprises a first phase adjustment and a second phase adjustment, each second phase adjustment having a magnitude and a sign; and wherein the one or more processing devices are further operable to establish the plurality of phase adjustments associated with the plurality of channel paths according to the plurality of individual complex channel gain estimates by:
calculating the plurality of first phase adjustments;
determining the magnitudes of the plurality of second phase adjustments;
alternating the signs of the second phase adjustments for each time interval of a plurality of time intervals and for each channel path of the plurality of channel paths; and
adding the first phase adjustments and the second phase adjustments to yield the plurality of phase adjustments.

16. A system for processing diversity signals, comprising:
a vector modulator operable to receive a first plurality of diversity signals at a plurality of antennas, the first plurality of diversity signals comprising communicated information, the plurality of antennas associated with a plurality of channel paths; and
one or more processing devices coupled to the vector modulator and operable to:
adjust a phase of each diversity signal of at least a subset of the first plurality of diversity signals;
combine the first plurality of diversity signals to form a combined signal;
process the combined signal to yield the communicated information;
determine a combined complex channel gain estimate of the first plurality of diversity signals from the combined signal;
calculate an individual complex channel gain estimate for each of the plurality of antennas from the combined complex channel gain estimate; and
establish a plurality of phase adjustments associated with the plurality of channel paths according to the plurality of individual complex channel gain estimates;
the vector modulator further operable to apply the plurality of phase adjustments to a second plurality of diversity signals, the second plurality of diversity signals comprising next communicated information; and the one or more processing devices further operable to process the second plurality of diversity signals to yield the next communicated information, wherein:

each phase adjustment of the plurality of phase adjustments comprises a first phase adjustment and a second phase adjustment, each second phase adjustment having a magnitude and a sign; and wherein the one or more processing devices are further operable to establish the plurality of phase adjustments associated with the plurality of channel paths according to the plurality of individual complex channel gain estimates by:

calculating the plurality of first phase adjustments;

determining the magnitudes of the plurality of second phase adjustments;

changing the second phase adjustments for each time interval of a plurality of time intervals and for each channel path of a plurality of channel paths such that the following are satisfied:

for each time interval, the second phase adjustments for at least two channel paths are different; and for each channel path, the second phase adjustments for at least two time intervals are different; and adding the first phase adjustments and the second phase adjustments to yield the plurality of phase adjustments.

17. Hardware logic for processing diversity signals, the hardware logic operable to:

receive a first plurality of diversity signals at a plurality of antennas, the first plurality of diversity signals comprising communicated information, the plurality of antennas associated with a plurality of channel paths;

adjust a phase of each diversity signal of at least a subset of the first plurality of diversity signals;

combine the first plurality of diversity signals to form a combined signal;

process the combined signal to yield the communicated information;

determine a combined complex channel gain estimate of the first plurality of diversity signals from the combined signal;

calculate an individual complex channel gain estimate for each of the plurality of antennas from the combined complex channel gain estimate;

establish a plurality of phase adjustments associated with the plurality of channel paths according to the plurality of individual complex channel gain estimates;

apply the plurality of phase adjustments to a second plurality of diversity signals, the second plurality of diversity signals comprising next communicated information; and process the second plurality of diversity signals to yield the next communicated information, wherein a phase adjustment of the plurality of phase adjustments comprises a first phase adjustment and a second phase adjustment, the first phase adjustment based on an individual complex channel gain estimate, the second phase adjustment based on a signal-to-noise ratio.

18. The logic of claim 17, wherein:

the first plurality of diversity signals has a number of time intervals; and the second plurality of diversity signals has the same number of time intervals, the number of time intervals being greater than or equal to the number of the plurality of antennas.

19. The logic of claim 18, further operable to process the combined signal to yield the communicated information by:

despreading a traffic channel embedded in the combined signal to form a plurality of finger signals, a finger signal corresponding to a multipath component of the combined signal;

weighting each finger signal to yield a plurality of weighted finger signals;

combining the plurality of weighted finger signals to yield a combined finger signal; and decoding the combined finger signal to determine the communicated information.

20. The logic of claim 17, further operable to determine the combined complex channel gain estimate of the first plurality of diversity signals from the combined signal by:

despreading a pilot channel embedded in the combined signal to form a plurality of finger signals, a finger signal corresponding to a multipath component of the combined signal; and determining the combined complex channel gain estimate from the plurality of finger signals.

21. The logic of claim 17, further operable to calculate the individual complex channel gain estimate for each of the plurality of antennas from the combined complex channel gain estimate by:

determining a covariance matrix for each channel path of the plurality of channel paths; and calculating an individual complex channel gain estimate associated with each of the plurality of antennas according to covariance matrix minimum and mean square error (MMSE) criteria.

22. The logic of claim 17, further operable to calculate the individual complex channel gain estimate for each of the plurality of antennas from the combined complex channel gain estimate by assuming a complex channel to be constant over a duration of the first plurality of diversity signals.

23. Hardware logic for processing diversity signals, the hardware logic operable to:

receive a first plurality of diversity signals at a plurality of antennas, the first plurality of diversity signals comprising communicated information, the plurality of antennas associated with a plurality of channel paths;

adjust a phase of each diversity signal of at least a subset of the first plurality of diversity signals;

combine the first plurality of diversity signals to form a combined signal;

process the combined signal to yield the communicated information;

determine a combined complex channel gain estimate of the first plurality of diversity signals from the combined signal;

calculate an individual complex channel gain estimate for each of the plurality of antennas from the combined complex channel gain estimate;

establish a plurality of phase adjustments associated with the plurality of channel paths according to the plurality of individual complex channel gain estimates;

apply the plurality of phase adjustments to a second plurality of diversity signals, the second plurality of diversity signals comprising next communicated information; and process the second plurality of diversity signals to yield the next communicated information, wherein:

each phase adjustment of the plurality of phase adjustments comprises a first phase adjustment and a second phase adjustment, each second phase adjustment having a magnitude and a sign; and the hardware logic is further operable to establish the plurality of phase adjustments associated with the plurality of channel paths according to the plurality of individual complex channel gain estimates by:
calculating the plurality of first phase adjustments;
determining the magnitudes of the plurality of second phase adjustments;
alternating the signs of the second phase adjustments for each time interval of a plurality of time intervals and for each channel path of the plurality of channel paths; and
adding the first phase adjustments and the second phase adjustments to yield the plurality of phase adjustments.

24. Hardware logic for processing diversity signals, the hardware logic operable to:
receive a first plurality of diversity signals at a plurality of antennas, the first plurality of diversity signals comprising communicated information, the plurality of antennas associated with a plurality of channel paths;
adjust a phase of each diversity signal of at least a subset of the first plurality of diversity signals;
combine the first plurality of diversity signals to form a combined signal;
process the combined signal to yield the communicated information;
determine a combined complex channel gain estimate of the first plurality of diversity signals from the combined signal;
calculate an individual complex channel gain estimate for each of the plurality of antennas from the combined complex channel gain estimate;
establish a plurality of phase adjustments associated with the plurality of channel paths according to the plurality of individual complex channel gain estimates;
apply the plurality of phase adjustments to a second plurality of diversity signals, the second plurality of diversity signals comprising next communicated information; and
process the second plurality of diversity signals to yield the next communicated information, wherein:
each phase adjustment of the plurality of phase adjustments comprises a first phase adjustment and a second phase adjustment, each second phase adjustment having a magnitude and a sign; and
the hardware logic is further operable to establish the plurality of phase adjustments associated with the plurality of channel paths according to the plurality of individual complex channel gain estimates by:
calculating the plurality of first phase adjustments;
determining the magnitudes of the plurality of second phase adjustments;
changing the second phase adjustments for each time interval of a plurality of time intervals and for each channel path of a plurality of channel paths such that the following are satisfied:
for each time interval, the second phase adjustments for at least two channel paths are different; and
for each channel path, the second phase adjustments for at least two time intervals are different; and
adding the first phase adjustments and the second phase adjustments to yield the plurality of phase adjustments.

25. A method for processing diversity signals, comprising:
receiving a first plurality of diversity signals at a plurality of antennas, the first plurality of diversity signals comprising communicated information, the plurality of antennas associated with a plurality of channel paths;
adjusting a phase of each diversity signal of at least a subset of the first plurality of diversity signals;
combining the first plurality of diversity signals to form a combined signal,
processing the combined signal to yield the communicated information, the combined signal processed to yield the communicated information by:
despreading a traffic channel embedded in the combined signal to form a plurality of finger signals, a finger signal corresponding to a multipath component of the combined signal;
weighting each finger signal to yield a plurality of weighted finger signals;
combining the plurality of weighted finger signals to yield a combined finger signal; and
decoding the combined finger signal to determine the communicated information;
determining a combined complex channel gain estimate of the first plurality of diversity signals from the combined signal, the combined complex channel gain estimate determined by:
despreading a pilot channel embedded in the combined signal to form the plurality of finger signals; and
determining the combined complex channel gain estimate from the plurality of finger signals;
calculating an individual complex channel gain estimate for each of the plurality of antennas from the combined complex channel gain estimate, the individual complex channel gain estimate calculated by:
assuming a complex channel to be constant over a duration of the first plurality of diversity signals;
determining a covariance matrix for each channel path of the plurality of channel paths; and
calculating an individual complex channel gain estimate associated with each of the plurality of antennas according to covariance matrix minimum and mean square error (MMSE) criteria;
establishing a plurality of phase adjustments associated with the plurality of channel paths according to the plurality of individual complex channel gain estimates, each phase adjustment of the plurality of phase adjustments comprising a first phase adjustment and a second phase adjustment, each second phase adjustment having a magnitude and a sign, the plurality of phase adjustments established by:
calculating the plurality of first phase adjustments;
determining the magnitudes of the plurality of second phase adjustments;
alternating the signs of the second phase adjustments for each time interval of a plurality of time intervals and for each channel path of the plurality of channel paths; and
adding the first phase adjustments and the second phase adjustments to yield the plurality of phase adjustments;
applying the plurality of phase adjustments to a second plurality of diversity signals, the second plurality of diversity signals comprising next communicated information; and
processing the second plurality of diversity signals to yield the next communicated information, the first plurality of diversity signals having a number of time intervals, the second plurality of diversity signals having the same number of time intervals, the number of time intervals being greater than or equal to the number of the plurality of antennas.

* * * * *